United States Patent [19]

Brems

[11] Patent Number: 4,497,393
[45] Date of Patent: Feb. 5, 1985

[54] ROTARY RETARDATION DEVICES

[76] Inventor: John H. Brems, Apt. 16-D, 2800 S. Ocean Blvd., Boca Raton, Fla. 33432

[21] Appl. No.: 327,515

[22] Filed: Dec. 4, 1981

[51] Int. Cl.³ .............................................. F16F 9/10
[52] U.S. Cl. .................... 188/322.5; 74/574; 188/290
[58] Field of Search ............... 188/80, 83, 84, 262, 188/266, 271, 290, 292, 293, 297, 298, 306, 307, 322.5, 268; 74/574

[56] References Cited

U.S. PATENT DOCUMENTS

| | | | |
|---|---|---|---|
| 2,905,430 | 9/1959 | Deist | 188/307 |
| 3,078,966 | 2/1963 | Thomas | 188/298 |
| 3,321,052 | 5/1967 | Ramoneda et al. | 188/293 |
| 3,353,632 | 11/1967 | Perhach | 188/268 |
| 3,381,781 | 5/1968 | Summerville, Jr. | 188/290 |
| 3,561,570 | 2/1971 | Sundermann | 188/266 |
| 3,648,815 | 3/1972 | Wochner | 188/290 |
| 3,871,496 | 3/1975 | Wigal | 188/322.5 |
| 4,257,495 | 3/1981 | Perry | 188/322.5 |
| 4,316,535 | 2/1982 | Brems et al. | 188/290 |

FOREIGN PATENT DOCUMENTS 969231  9/1964  United Kingdom .

*Primary Examiner*—Douglas C. Butler
*Assistant Examiner*—R. R. Diefendorf
*Attorney, Agent, or Firm*—Barnes, Kisselle, Raisch, Choate, Whittemore & Hulbert

[57] ABSTRACT

A rotary retardation device utilizing viscous fluid responsive to angular velocity in which the viscous fluid is retained in a cavity, one wall of which is a flexible deformable member, the fluid being sealed in the cavity, and a relatively movable rotary member bearing on the flexible member in a moving path to respond in rotation to the action of the viscous fluid in the cavity.

2 Claims, 19 Drawing Figures

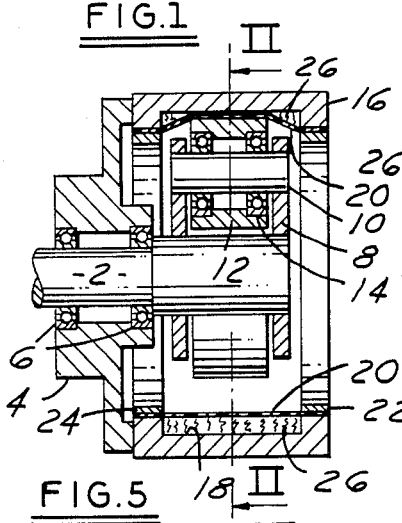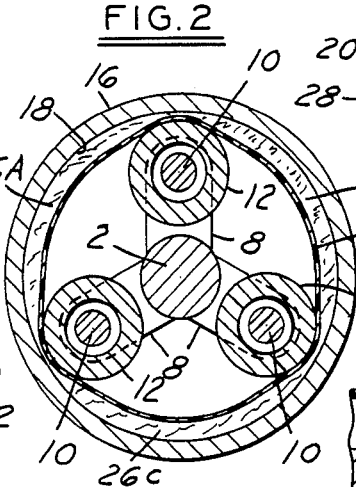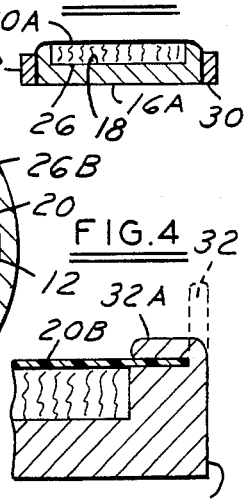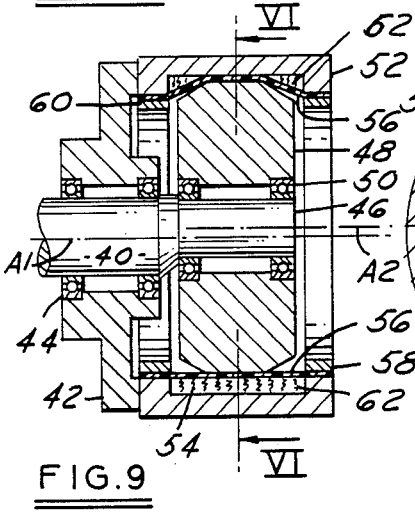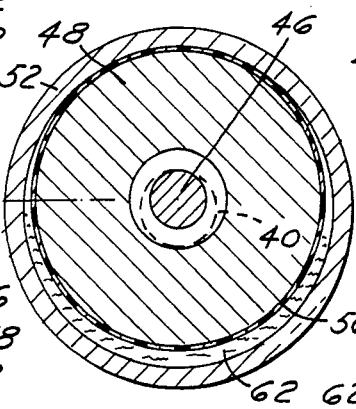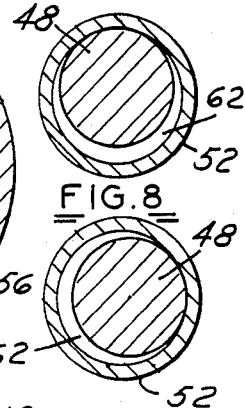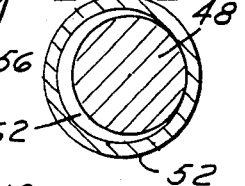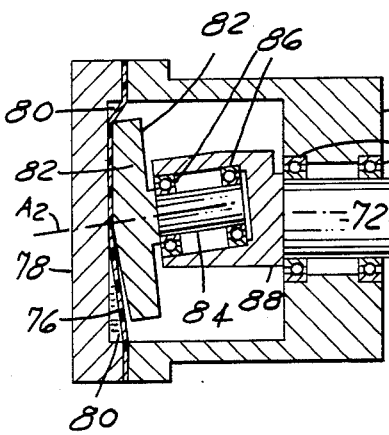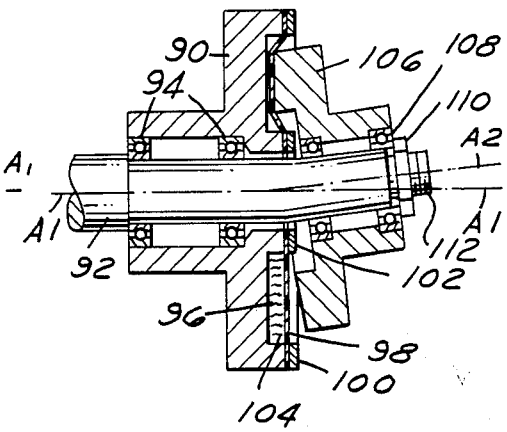

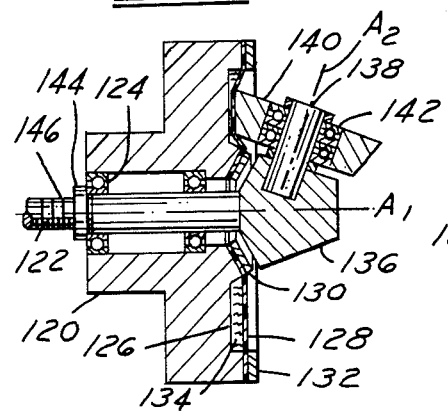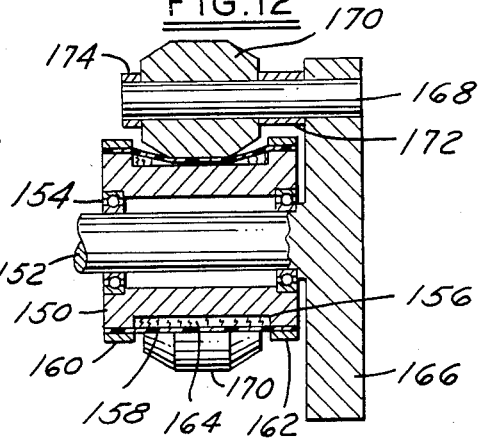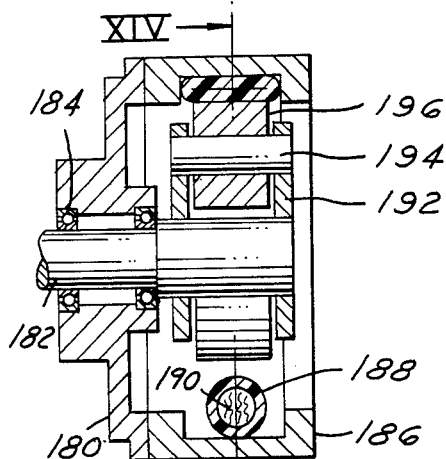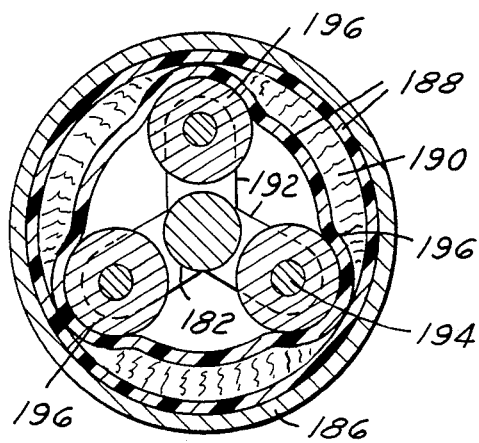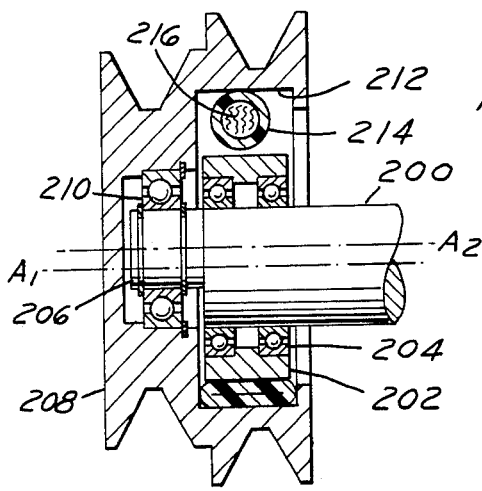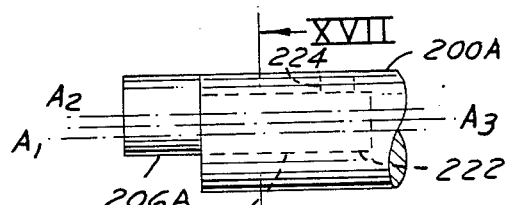

FIG. 18
FIG. 19
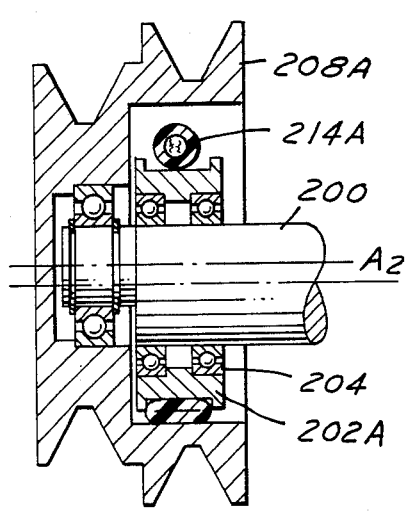
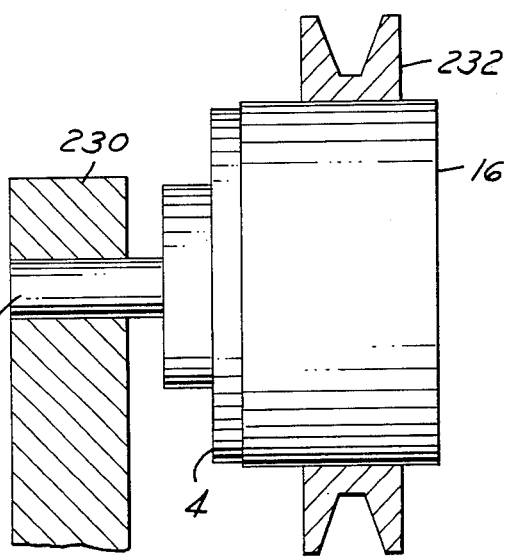

ROTARY RETARDATION DEVICES

FIELD OF INVENTION

Rotary retardation devices utilizing viscous fluid responsive to angular velocity.

BACKGROUND AND OBJECTIVES OF THE INVENTION

In the field of gravity powered part transfer system, applications arise requiring simple and inexpensive speed control or retardation systems. One type of device often times used employs a viscous Newtonian fluid operating in shear between a fixed surface such as a housing and a moving surface such as a rotor. One such type of application is shown in my copending patent application, Ser. No. 176,562, filed Aug. 8, 1980, which issued as U.S. Pat. No. 4,316,535 on Feb. 23, 1982.

The most significant single practical problem with these viscous retardation devices is the retention of the fluid within the working space. The best present solution is the use of complex and expensive seals. It is one object of this invention to circumvent the moving or rotating seal problem by devising a group of retarders which require no moving seal surfaces.

Leakage problems on retarders using rotating seals and having fixed cavities are often times increased due to temperature variations which can build up fluid pressures. It is another object of this invention to provide a retarding system in which the slight contractions and expansions of the retarding fluid in the retaining cavity due to temperature changes create no problems.

Other objects and features of the invention will be apparent in the following description and claims in which the principles of the invention are set forth together with details of the structure to enable those skilled in the art to practice the invention, all in connection with the best mode presently contemplated for the invention.

BRIEF DESCRIPTION OF THE DRAWINGS

DRAWINGS accompany the disclosure and the various views thereof may be briefly described as:

FIG. 1, a longitudinal cross-section of one embodiment of this invention.

FIG. 2, a transverse cross-section taken on line II—II of FIG. 1.

FIG. 3, a section showing an alternate means of connecting a membrane to a ring.

FIG. 4, a second alternate section showing means to connect a membrane to a ring.

FIG. 5, a longitudinal cross-section of a second embodiment of this invention.

FIG. 6, a transverse cross-section taken on line VI—VI of FIG. 5.

FIGS. 7 and 8, schematic cross-sections of FIG. 5 showing fluid displacement during rotation.

FIG. 9, a longitudinal cross-section of an embodiment of this invention utilizing a planar membrane.

FIG. 10, a longitudinal cross-section of an embodiment of this invention utilizing an annular membrane.

FIG. 11, a longitudinal cross-section of a second embodiment of this invention utilizing an annular membrane.

FIG. 12, a longitudinal cross-section of an embodiment of this invention utilizing an external cylindrical membrane.

FIG. 13, a longitudinal cross-section of an embodiment of this invention using a toroidal tubular membrane.

FIG. 14, a transverse cross-section taken on line XIV—XIV of FIG. 13.

FIG. 15, a longitudinal cross-section of an embodiment of this invention in which it is built internal to the controlled wheel.

FIG. 16, a variation on the embodiment of FIG. 15 wherein the eccentricity is made adjustable.

FIG. 17, a transverse section taken on line XVII—XVII of FIG. 16.

FIG. 18, a longitudinal cross-section of an embodiment of this invention in which a tubular annular membrane is part of the reaction wheel.

FIG. 19, another embodiment of this invention in which the retarding system is housed within the wheel.

DESCRIPTION OF THE INVENTION AND THE MANNER AND PROCESS OF USING IT

Referring to FIGS. 1 and 2, a shaft 2 is journalled in a housing 4 through bearings 6. Three pairs of arms 8 are welded to or made integral with the shaft 2 at its one end; between each pair of arms 8 is supported a shaft 10 on an axis parallel to the axis of shaft 2. Each shaft 10 supports a roller 12 through bearings 14.

An annular ring 16 is concentrically attached by suitable means, not shown, such as bolts to the housing 4; its inner surface is formed into a cavity 18 which is sealed by a flexible cylindrical membrane 20 clamped to the annular ring 16 by two clamp rings 22 and 24. The interspace between the flexible membrane 20 and the cavity 18 of the annular ring 16 is filled with a viscous fluid 26 such as a silicone oil.

Throughout the following specification, annular housing parts and sealing plates or rings are illustrated. These can be held securely in place by shoulder bolts or countersunk screws. The rings 22 and 24 can be installed at a cold temperature and expanded to ambient temperature to seal or they may be split rings suitably expanded by a wedge secured near the perimeter.

Referring to FIG. 2, it can be seen that each of the three rollers 12 deflects the flexible membrane 20 causing it to almost touch the bottom of the cavity 18 in the annular ring 16; this divides the fluid 26 into three segments labelled 26A, 26B and 26C. Now if the shaft 2 is rotated by some external means with respect to the housing 4 and annular ring 16, it can be seen that the three rollers 12 progressively deflect the flexible membrane 20 causing the fluid 26 trapped in the three segments 26A, 26B and 26C to move in the same direction as the rotation of the shaft 2.

Considering the behavior of a given segment of fluid such as 26A, it is partially trapped by the constricted sections between the deflected flexible membrane 20, created by the rollers 12, and the ring 16. As the two rollers 12, which are the end points of that given segment of fluid, move in a given direction, the fluid must accommodate itself to that motion.

With the configuration shown, in which a complete seal between the flexible membrane 20 and ring 16 is not created, the fluid in segment 26A adjusts to the motion of the rollers in two ways. One portion moves forward of the rollers; this portion will be retarded due to the viscous drag of the fluid with the wetted faces of the cavity and the flexible membrane. A second portion of the fluid will squeeze backward through the restriction created by deflection of the membrane by the roller, again retarded by its own viscosity. The sum of these effects is to create a force imbalance on the periphery of each roller and energy must be expended to rotate the shaft 2.

The motion of the fluid, either forward or backward, is controlled by its viscosity, or resistance to shear, and the resistance to shear is proportional to the rate of shear; therefore, the total resistance to the rotation of the rollers is proportional to the velocity of the rollers and their driving shaft 2. The energy required to deflect the flexible membrane is largely recaptured on the "back" side of a moving roller, although a slight loss may be encountered due to the hysteresis of the material. Deflection of the membrane (as opposed to the deformation of the fluid) therefore generally has a very small effect. Any fluid impervious flexible material may be used for the membrane material such as rubberized fabric, rubber sheets, butyl rubber material and the like.

It is possible to design a cavity and roller configuration in which a substantially perfect seal is created between the membrane and the cavity by a roller, in which case the fluid must all move forward in response to roller motion, but in either case the torque input required at shaft 2 is proportional to the fluid viscosity and the angular velocity of shaft 2.

A device of this type is therefore suitable for application as a retarder, such as exemplified in my referenced copending application, while eliminating the practical problems of seal leakage associated with conventional devices.

As noted above, the restricted space between the membrane and the ring under a give roller may or may not constitute a seal between the membrane and the ring. If a seal exists, the trapped fluid must move with the rollers; if a seal does not exist, some of the trapped fluid will move backward through the restricted section. Furthermore, it can be seen that the smaller the amount of local deflection of the membrane by the roller, the more the fluid will tend to flow backward, and the smaller the amount the fluid that must be displaced by the moving restriction. As a broad generalization, then, for a given cavity and membrane design, the amount of retardation is proportionally related to the amount of deflection of the membrane by the rollers, and the amount of retardation can be controlled or adjusted through a change in the roller to membrane spacing as will subsequently be shown.

FIG. 3 illustrates an alternate method of fastening the flexible membrane to the annular ring. The annular ring 16A has formed in it an annular cavity 18 closed by a flexible membrane 20A which wraps around the lateral faces of the ring 16A where it is clamped to these faces by clamp washers 28 and 30.

A second alternate means of fastening the membrane to the ring is shown in the enlarged partial section of FIG. 4. In this case the ring 16B is initially formed with an integral upstanding flange 32 (and another such flange on its other side). After the membrane 20B has been properly positioned with respect to the ring 16B, the flange 32 is rolled over to its final position 32A in which it clamps and seals the flexible membrane 20B to the ring 16B.

A second embodiment of a hermetically sealed retarder is shown in FIGS. 5 and 6. A shaft 40 is journalled in a housing 42 through bearings 44 and rotates about axis $A_1$; the forward end of the shaft 40 is formed into an eccentric portion 46 concentric about an axis $A_2$, parallel to and displaced from axis $A_1$. A roller 48 is journalled on the eccentric portion through bearings 50.

An annular ring 52 is concentrically attached to the housing 42 by suitable means, not shown; the inner surface is formed into a cavity 54 which is sealed by a flexible cylindrical membrane 56 clamped to the annular ring 52 by two clamp rings 58 and 60. The interspace between the flexible membrane 56 and the cavity 54 of the annular ring 52 is filled with a viscous fluid 62 such as a silicone oil. It can be seen (FIG. 6) that the eccentricity of the roller 48 deforms the membrane 56 and the fluid 62, sealed between it and the concentric ring 52, into a crescent shaped section; i.e., an annular form having a minimum cross-section at the top as viewed in FIG. 6 and a maximum cross-section at the bottom.

The behavior of the fluid 62 as the shaft 48 is rotated may be visualized by reference to the schematic drawings, FIGS. 7 and 8. In FIG. 7, the crescent of fluid 62 is shown in the same relative position as in FIGS. 5 and 6. In FIG. 8, the shaft 40 has been rotated through an angle of 90° clockwise relative to its position in FIG. 7. It can be seen that the center of the eccentric roller 48 on axis $A_2$ has also been moved 90° clockwise about the axis of rotation $A_1$. The crescent of fluid 62 has also been rotated through an angle of 90°. In order for the body of fluid to be transformed from the configuration of FIG. 7 to the configuration of FIG. 8, considerable internal shearing takes place. This shearing creates a resistance to rotation of the shaft 40 which is proportional to the angular velocity of the rotation; this is similar to the behavior described in connection with the embodiment of FIGS. 1 and 2.

The embodiments of FIGS. 1 to 7 both utilize a cylindrical membrane in which the membrane is deflected in a radial direction to create a generally circumferential fluid shear motion. It is also possible to use a substantially flat membrane in which the fluid is urged to move in a circular direction through the axial deflections of the membrane.

Referring to FIG. 9, a circular housing 70 has mounted in it a shaft 72 through bearings 74. A flat flexible membrane 76 is clamped between the housing 70 and a circular cover 78, and the cavity formed between the cover 78 and the membrane 76 is filled with a viscous fluid 80. A pressure plate 82 contacting and deflecting the membrane 76 is mounted to or integral with a shaft 84 which is journalled through bearings 86 in an enlarged section 88 of the shaft 72. It will be noted that the axis $A_2$ of shaft 84 is inclined at an angle to the axis $A_1$ of shaft 72. Furthermore, the face of the pressure plate 82 in contact with the membrane 76 is formed into a cone whose semi-angle is approximately complementary to the angle between axes $A_1$ and $A_2$. It can be seen that the axes $A_1$ and $A_2$ intersect at approximately the apex of the conical face of the pressure plate 82. The membrane 76, which would be flat in the absence of the pressure plate 82, is deflected as shown in section in FIG. 9 by the contact of the conical face of pressure plate 82. The fluid 80 is forced into a generally circular double wedge shape having one flat side (against the cover) and an inclined inverted cone side (against the membrane), which will be referred to for the sake of simplicity as a fluid wedge.

As the shaft 72 is rotated, the pressure plate 82 nutates on the membrane 76; this forces the fluid wedge between the membrane 76 and the cover 80 to rotate with the shaft 72. This rotation of the fluid wedge is, in effect, a progressive and continuous deformation of the fluid accomplished through internal shearing, which, due to the viscosity of the fluid, creates a retarding torque proportional to the rate of shear, or its equivalent, the angular velocity of the shaft 72.

Another embodiment which employs a flat membrane, in this case, an annular membrane, is shown in FIG. 10. A housing 90 supports a shaft 92 through bearings 94. A cavity 96 is formed in a flange portion of the housing 90. This cavity 96 is sealed by a flexible membrane 98 held in place by clamp rings 100 and 102. A viscous fluid 104 fills the cavity 96 between the membrane 98 and housing 90.

That portion of the shaft 92 extending through the bearings 94 rotates about an axis $A_1$. In approximately the plane of the membrane, the axis of the shaft bends slightly and this extended inclined axis is labeled $A_2$. Concentric about the axis $A_2$ is mounted an annular pressure plate 106 through bearings 108. The axial position of the bearings 108 and pressure plate 106 is controlled by a nut 110 operating on threads 112 on the inclined portion of shaft 92 about axis $A_2$.

As the shaft 92 is rotated about axis $A_1$ in bearings 94, the angled portion of the shaft about axis $A_2$, wobbles as the axis $A_2$ describes a conical path. The contact surface of the pressure plate 106, which is a shallow conical surface having a semi-angle approximately complimentary to the angle of inclination of axis $A_2$ from axis $A_1$, causes a local depression of the membrane 98 and in the fluid 104 sealed under it. The rotation of shaft 92 causes this depression of the membrane 98 to move angularly about the annular surface of the membrane 98 in step with the rotation of shaft 92. As the pressure plate 106 rotates on bearings 108, it describes a nutating motion. This depression of the membrane causes a deformation of the fluid sealed behind it, and as the depression moves, the fluid again accommodates itself through internal shearing and creates a retarding torque proportional to the velocity of movement, or to the angular velocity of the rotation of shaft 92. Furthermore, as a rough approximation, the retarding torque is proportional to the amount of deformation of the fluid through the membrane which is controlled by the axial position of the pressure plate; this in turn is adjustable through the nut 110 on the thread 112. Therefore, by adjusting the nut 110, it is possible to vary the torgue to angular velocity ratio of the device.

FIG. 11 shows another adjustable embodiment again employing an annular membrane. A housing 120 has mounted in it a shaft 122 rotating in bearings 124 about an axis $A_1$. A flanged section of the housing has formed in it a cavity 126 which is sealed by a membrane 128 held in place by clamp rings 130 and 132. A viscous fluid 134 is confined in the cavity 126 by the membrane as in the other embodiments. An enlarged portion 136 of the shaft 122 has fixed in it a short shaft 138 concentric about an axis $A_2$ angled about the axis $A_1$ of shaft 122. A conical roller 140 is journalled on the shaft 138 through bearings 142. The outside conical face of the roller 140 is in contact with the membrane 128 and creates a local depression therein and in the fluid 134 sealed behind it. The amount of this deformation is controlled by the axial position of the shaft 122, which, in turn, is determined by the setting of a nut 144 on threads 146 on shaft 122.

It can be seen that as the shaft 122 is rotated about axis $A_1$, the deformation of the fluid through the membrane moves around the annular path traced by the roller in step with the shaft rotation. This deformation is again accomplished through internal shearing of the fluid which creates a retarding torque proportional to the angular velocity of the shaft. Additionally, it is possible to add more rollers to the enlarged section 136 of the shaft 122 to increase this retarding torque, as well as adjusting the depth of deformation through the axial position of shaft 122 controlled by nut 144.

FIG. 12 again shows a cylindrical membrane; the rollers are on the outside rather than inside the membrane as before. A stationary body 150 supports a shaft 152 through bearings 154. The outside diameter of the body 150 has formed into it a cylindrical cavity 156 which is enclosed by a cylindrical flexible membrane 158 held in place by clamp rings 160 and 162. A viscous fluid 164 is sealed in the cavity 156 by the membrane 158. A flange 166 is fixed to one end of shaft 152 and three shafts 168 are mounted therein at equal circumferential intervals. A roller 170 is journalled on each shaft 168 and held in place by spacer 172 and retainer 174. Each roller 170 contacts and deflects the membrane 158 and the fluid 164 sealed between it and the body 150. As the shaft 152 is rotated relative to the body 150, the rollers 170 roll around the periphery of the membrane 158 in a planetary manner causing the fluid to be progressively deformed under each roller through internal shearing, thereby creating a retarding torque proportional to the angular velocity of shaft 152. While the embodiment shown in FIG. 12 employs three rollers, it is easily seen that a larger number of rollers can be utilized to increase the retardation. It will be appreciated that part 166 could be stationary and body 160 could be rotated to obtain the same effect.

Whereas in the previous embodiments, the viscous fluid which provides the retardation was sealed between a flexible membrane and a cavity formed in an essentially rigid body, the following embodiments employ a viscous fluid sealed within a deformable tubular member.

Referring to FIGS. 13 and 14, a housing 180 supports a shaft 182 in bearings 184. Concentrically mounted to the housing 180 is an internally recessed ring 186 in whose recess is nested a tubular toroidal flexible tube 188 which is filled with a viscous fluid 190. Three pairs of radial arms 192 are mounted on the shaft 182. Between each pair of radial arms 192 is mounted a shaft 194 substantially parallel to the shaft 182. A roller 196 is journalled on each shaft 194 and the outer periphery of each roller 196 contacts and compresses the tube 188 deforming it locally from a normal circular section (through the toroid) to a nearly flattened section as it is compressed between a roller 196 and the ring 186.

As the shaft 182 is rotated with respect to the housing 180 and the ring 186, the rollers 196 progressively deform the tube at the moving contact points, and, as these deformed sections progress along the toroidal tube 188, the fluid 190 sealed therein is progressively deformed accommodating itself through internal shearing and offering a resistance proportional to the rate of deformation. A retarding torque proportional to the angular velocity of shaft 182 therefore results. While the embodiment of FIGS. 13 and 14 show three rollers so radially positioned as to cause substantial flattening of the tube at the contact points, it will be understood that the number of rollers can be varied from a minimum of one to a maximum determined by the inter roller clearances, and further that the roller may be radially positioned to cause only a partial flattening of the tube, resulting in a lower torque for a given angular velocity.

A variation of the embodiment shown in FIGS. 13 and 14 is shown in FIG. 15. Since one of the applications of this invention is in the velocity control of wheels as shown in my previously referenced copending patent application, Ser. No. 176,562, now U.S. Pat. No. 4,316,535, the embodiment of FIG. 15 addresses itself to this specific application. Referring to FIG. 15, a stationary shaft 200 on axis $A_1$ is attached to a pallet or other type of loading or supporting member, not shown. A roller 202 is concentrically mounted on shaft 200 through bearings 204. An extended portion 206 of the shaft 200 is eccentric thereon and concentic about an axis $A_2$ displaced from axis $A_1$. A wheel 208 is coaxially journalled on the extended portion 206 through a bearing 210; the wheel 208 therefore rotates about axis $A_2$. The wheel 208 is flanged to ride on a narrow rail track as shown in my referenced copending application, Ser. No. 176,562, now U.S. Pat. No. 4,316,535. A recess 212 in the wheel 208 nests a toroidal tubular flexible sealed tube 214 which is filled with a viscous fluid 216. This tube is compressed in one radial direction, related to the shaft 200, by the roller 202 which is concentric about axis $A_1$ while the recess 212 supporting the tube 214 is concentric about axis $A_2$. Therefore, as the wheel 208 is rotated about axis $A_2$, the tube 214 is progressively deformed by the roller 202, causing the fluid to deform through internal shearing creating a retarding torque proportional to the angular velocity of the wheel.

In the embodiment of FIG. 15, it can be seen that the eccentricity between axes $A_1$ and $A_2$ is such as to create a substantially complete collapse of the tube 214 between the roller 202 and wheel recess 212 at their point of closest approach. It is also clear that if the eccentricity is decreased, as is possible by decreasing the distance between axes $A_1$ and $A_2$, that the collapse of the tube 214 is decreased and the deformation of the fluid through shearing is also decreased. Therefore, the torque to velocity ratio can be decreased by reducing the distance between axes $A_1$ and $A_2$.

A simple method of arranging a variable distance between axes $A_1$ and $A_2$ and thereby creating a method of varying the torque to velocity ratio is shown in FIGS. 16 and 17, in which the bearings, wheel, and roller have been omitted for clarity. The shaft 200A has been modified by deleting the extended portion 206 and replacing it with an eccentric hole 220 concentric about an eccentric axis $A_3$. The extended portion 206 has been replaced with a shaft section 206A concentric about axis $A_2$ having an integral mounting rod 222, concentric about the axis $A_3$, and eccentric from $A_2$; the rod 222 is angularly adjustable in the hole 220 and lockable with a set screw 224. In the position shown in FIGS. 16 and 17, the eccentricities $A_1$ to $A_3$ and $A_3$ to $A_2$ are angularly aligned such that the total eccentricity from $A_1$ to $A_2$ is the same as shown in FIG. 15. It can be seen that if the rod 222 is rotated in the hole 220 that the total eccentricity, from axis $A_1$ to $A_2$, may be decreased, until a minimum total eccentricity is reached after 180° of such rotation. Indeed, if the eccentricity from $A_1$ to $A_3$ is made the same as the eccentricity from $A_2$ to $A_3$, the total eccentricity can be made zero. This is then a convenient method of adjusting the eccentricity and thereby the torque to velocity ratio of the embodiment of FIG. 15.

FIG. 18 is a near duplication of FIG. 15 with the difference lying in the situation that the toroidal tubular flexible sealed tube 214A is fit into a recess on the outer diameter of the roller 202A while the inner diameter of the wheel 208A becomes the means for deflecting the tube 214A. This inversion can also be made variable by the technique of FIGS. 16 and 17.

In many of the embodiments, such as those shown in FIGS. 1, 5, 9, 11 and 13, the implied application assumed that the body or housing would be mounted to a carrier or pallet while the input shaft would be connected to some load to be retarded. An inversion of these systems is also possible, as illustrated by FIG. 19 which is a modification of FIG. 1. It will be understood that the internal mechanism of FIG. 19 is identical with that of FIG. 1. In FIG. 19, the shaft 2 is clamped to a pallet or carrier hanger 230 while a wheel 232 is mounted on outer diameter of the ring 16. This inversion is appropriate for applications such as illustrated in my referenced copending application, Ser. No. 176,562, now U.S. Pat. No. 4,316,535. It has the advantage of utilizing the bearings in the retarding system as the bearings in the wheel also.

I claim:

1. In a rotary device for angular velocity control in which the retarding torque is substantially proportional to the angular velocity, and which utilizes the deformation of a viscous fluid to create said retarding torque, a construction which includes:
   (a) a first torque member,
   (b) a second torque member mounted for unlimited rotation relative to said first torque member in a clockwise or counter-clockwise direction, and
   (c) a rotating member mounted on one of said torque members for rotation relative to the other of said torque members, and
   that improvement which comprises an annular shallow cavity formed in one of said members having on open side, and a flexible deformable membrane diaphragm overlying said open side to close said cavity, said diaphragm being sealed to the open side of said cavity, and a quantity of viscous fluid in said sealed cavity, said membrane being in contact with a rotating path of one of said torque members, whereby a relative rotational movement between said first and second torque members creates a progressive deflection of said diaphragm between said rotating member and one of said torque members causing a progressive shearing of said viscous fluid thereby creating a retarding torque between said first and second torque members.

2. A rotary device for angular velocity control as defined in claim 1 in which a first torque member comprises a cylindrical member rotatable on a first axis having a circular wall formed with a shallow recess having radially extending circular flanges providing sides of said shallow recess and having edges circumferential to said axis, an annular diaphragm overlying the edges of said flanges to close said shallow recess, and annular axially spaced means overlying the edges of said diaphragm and the said flanges to seal said diaphragm against said flanges.

* * * * *